United States Patent
Noguet et al.

(10) Patent No.: US 7,460,582 B2
(45) Date of Patent: Dec. 2, 2008

(54) METHOD AND DEVICE FOR DETECTION OF DATA TRANSMITTED BY SPECTRUM SPREADING

(75) Inventors: Dominique Noguet, St. Simian de Brerniern (FR); Mathieu Bouvier des Noes, Grenoble (FR)

(73) Assignee: Commissariat a l'Energie Atomique (FR)

( * ) Notice: Subject to any disclaimer, the term of this patent is extended or adjusted under 35 U.S.C. 154(b) by 910 days.

(21) Appl. No.: 10/412,195

(22) Filed: Apr. 11, 2003

(65) Prior Publication Data
US 2004/0052303 A1    Mar. 18, 2004

(30) Foreign Application Priority Data
Apr. 12, 2002    (FR) ................................. 02 04616

(51) Int. Cl.
*H04B 1/10* (2006.01)
*H04L 1/00* (2006.01)
(52) U.S. Cl. .................... 375/147; 375/229; 375/346
(58) Field of Classification Search ......... 375/140–144, 375/147, 148, 150, 229, 346
See application file for complete search history.

(56) References Cited

U.S. PATENT DOCUMENTS 6,307,851 B1 * 10/2001 Jung et al. ................. 370/342
7,079,607 B2 * 7/2006 Brunel ....................... 375/346

FOREIGN PATENT DOCUMENTS

WO        99/65160        12/1999

OTHER PUBLICATIONS

"Algorithms for VLSI Processor Arrays", 1980, Addison-Wesley, (Kung, H.T. and Leiserson, C.E., Chapter Systolic Arrays for VLSI-Chap. 8.3), pp. 271-292.
Kung, H.T., "Systolic Algorithms and Their Implementation", 1984, Proceedings of the Seventeenth Hawaii International Conference on System Sciences, pp. 5-11.
Manjikian, Naraig, "A Vector Multiprocessor for Real-Time Multi-User Detection in Spread-Spectrum Communication", Jul. 2000, IEEE International Conference on Application Specific Systems, Architectures and Processors, pp. 185-194.
Wang et al., "Adaptive Joint Multiuser Detection and Channel Estimation in Multipath Fading CDMA Channels", 1998, Wireless Networks, vol. 4, pp. 453-470.

* cited by examiner

*Primary Examiner*—David B Lugo
(74) *Attorney, Agent, or Firm*—Connolly Bove Lodge & Hutz LLP

(57) ABSTRACT

The invention relates to a method and device for the joint detection of data transmitted by direct sequence spread spectrum (DSSS).

The device comprises means of using a Cholesky decomposition to calculate a matrix U such that:

$L = U^H \times U$, where

L is an equalization matrix and U is an upper triangular matrix. The means for using a Cholesky decomposition comprise MAC cells ($MAC_1$, $MAC_2$, ..., $MAC_N$) and a diagonal cell (DIAG) of a systolic network. The MAC cells and the diagonal cell are also used to calculate an estimated vector $\hat{d}$ of received data.

For example, the invention applies to the field of digital mobile phone transmissions.

20 Claims, 10 Drawing Sheets

METHOD AND DEVICE FOR DETECTION OF DATA TRANSMITTED BY SPECTRUM SPREADING

CROSS-REFERENCE TO RELATED APPLICATION

This application claims priority based on French Patent Application No. 02 04616, entitled "Method And Device For Detection Of Data Transmitted By Spectrum Spreading" by Dominique Noguet and Mathieu Bouvier des Noes, which was filed on Apr. 12, 2002, and which was not published in English."

DESCRIPTION

1. Technical Field and Prior Art

This invention relates to a method for detection of data transmitted by spectrum spreading by direct sequence and a device for using the method.

The field of application of the invention is digital transmissions by Direct Sequence Spread Spectrum (DSSS). DSSS digital transmissions are used in Code Division Multiple Access (CDMA) systems.

In a CDMA system, users share the same frequency band. Discrimination between users is possible due to the assignment of different spreading codes to each user.

A particular user's receiver receives not only the signal intended for this user but also signals addressed to other users. Interference caused by received signals addressed to other users, commonly called Multiple Access Interference (MAI), then needs to be minimized. Moreover, it is also necessary to reduce interference inherent to the transmission channel.

The signal received at the input to a digital receiver is represented by the complex vector e such that:

$$e = A.d + n \qquad (1)$$

where:
- A is a complex matrix that depends on the channel pulse response and spreading codes related to the CDMA system,
- d is a complex vector composed of data emitted by users and that is to be estimated,
- n is a random interference vector.

The receiver calculates a vector $\hat{d}$ which is the estimate of the vector d based on knowledge of the vector e and the matrix A calculated or evaluated in advance. The vector $\hat{d}$ must also be as close as possible to d. This is done by attempting to cancel out distortions and disturbances introduced by the transmission sequence between the transmitter and the receiver. This operation to cancel out distortions and disturbances is called equalization. If equalization is perfect, $\hat{d}=d$.

One essential difficulty lies in the fact that the receiver does not have sufficient information to solve equation (1). The solution of equation (1) is then based on the use of optimization criteria in order to obtain perfect equalization.

Various techniques are known for solving equation (1). One of these techniques is the joint detection technique that consists of estimating the entire vector d, in other words all data emitted by all users. In this case, the estimated vector $\hat{d}$ is calculated by an equation of the following type:

$$\hat{d} = L^{-1}.A^H.e \qquad (2)$$

in which:
- $L^{-1}$ is the inverse matrix of a matrix L, commonly called the equalization matrix, that is a square matrix with size N×N and which is expressed as a function of optimization criteria chosen to solve equation (1), and
- $A^H$ represents the square matrix symmetric with matrix A (in other words the transposed conjugate matrix of A).

Different examples of joint detection can be mentioned. A first example relates to detection by which the matrix L is written $A^A.A$ and that is intended to cancel out MAI interference (ZF equalization, where ZF stands for "Zero Forcing"). A second example relates to detection by which the matrix L is written $AH.A + \sigma^2 I$, where $\sigma^2$ is the interference variance and I is the unit matrix (MMSE—Minimum Mean Square Error—equalization). In this case, the distance between the estimated vector $\hat{d}$ and the vector d is evaluated without distinguishing the effect of interference n from the effect of MAI interference.

In general, to solve equation (2), the receiver begins by calculating the vector $z = A^H.e$ starting from the matrix A that it knows and the vector of received data e. The equation (2) may then be expressed in the following form:

$$z = L.\hat{d} \qquad (3)$$

One conventional technique for solving the equation (3) consists of inverting the matrix L and multiplying the 2 terms of equation (2) at the right by the matrix $L^{-1}$, the inverse of the matrix L. However, this technique must be avoided if the matrix L is large, and if the time available to solve the equation (3) is very short. For example, this is the case for TDD (Time Division Duplex) mode for the UMTS (Universal Mobile Telecommunication System) system. Equation (3) then has to be solved in less than 0.666 ms for a matrix L with a size of about 500×500 complex coefficients. The conventional technique by inversion of the matrix L mentioned above is incapable of solving equation (3).

Vector architectures had been proposed due to the complexity of the problems that arise (see "A vector multiprocessor for real-time multi-user detection in spread spectrum communication", IEEE International Conference on Application Specific Systems, Architectures and Processors, Boston, July 2000). However, these architectures were only designed to solve small linear systems (32×32 matrix). A direct transposition of this type of architecture to detection systems in the field of the invention, for which the size may for example reach 500×500 (see above) is unthinkable because it would also involve extremely complex hardware systems, for example processors.

Another technique that requires fewer calculations, consists of making use of the properties of the L matrix to do Cholesky decomposition given by the formula $L = U^H.U$ where U is an upper triangular matrix with size N×N for which the elements denoted $u_{ij}$ are determined from elements of the matrix L denoted $l_{ij}$.

The equation (3) is then solved in two steps. The first step is a Cholesky decomposition of the matrix L to obtain the matrix U. The result is then:

$$Z = L.\hat{d} = U^H.U.\hat{d} \qquad (4)$$

A second step consists of solving the equation:

$$Z = U^H.Y \qquad (5)$$

in order to obtain the matrix y from the known $U^H$ and z matrices, and then the equation:

$$Z = U.\hat{d} \qquad (6)$$

which is used to obtain $\hat{d}$ from the U and y matrices calculated previously.

These operations are programmed on a conventional computer, or possibly a signal processor ((DSP). However, the performances of these computers are not sufficient to achieve real time performances for large matrices mentioned above.

The invention does not have the disadvantages mentioned above.

PRESENTATION OF THE INVENTION

The invention relates to a device for joint detection of data transmitted by direct sequence spread spectrum (DSSS), the device comprising means of using a Cholesky decomposition to calculate a matrix U such that:

$$L=U^H \times U,$$

Where L is an equalization matrix and U is an upper triangular matrix. The means for using a Cholesky decomposition comprise:

means of calculating the diagonal coefficients $U_{i,i}$ of the matrix U using the formula:

$$U_{i,i} = \sqrt{1_{i,i} - \sum_{k=1}^{i-1} |u_{k,i}|^2} \qquad (1)$$

where $l_{i,i}$ is the diagonal coefficient of the row rank i of matrix L and $u_{k,i}$ is the coefficient of the row rank k and column rank i of the matrix U, and means of calculating non-diagonal coefficients of the matrix in the form:

$$u_{i,j} = u_{i,j} = \frac{l_{i,j} - \sum_{k=1}^{i-1} u^*_{k,i} \cdot u_{k,j}}{u_{i,i}},$$

the means for calculating the non-diagonal coefficients including:

a network of N MAC cells installed in series, each MAC cell comprising an accumulation input, an accumulation output, a return input, a return output and a coefficient input, the accumulation output of the rank p cell (p=1 to N) being connected to the accumulation input of the rank p+1 cell, a diagonal cell comprising an accumulation input, a subtraction coefficient input, a division coefficient input, a result output and a return output, the accumulation input of the diagonal cell being connected to the accumulation output of the rank N MAC cell, means of loading coefficients $u^*_{k,i}$ onto the return inputs of MAC cells, means of loading coefficients $u_{k,j}$ on the coefficient inputs of MAC cells, means of loading coefficients $u_{i,i}$ on the division coefficient input of the diagonal cell, and means of loading coefficients $l_{i,j}$ on the subtraction coefficient input of the diagonal cell.

According to a first embodiment of the invention, the means of loading coefficients $u^*_{k,i}$ on the return inputs from MAC cells consist of a set of N multiplexers ($M_1$, $M_2$, ..., $M_N$) controlled by a first command state, each multiplexer having a first input, a second input and an output, the output from a rank p multiplexer (p=1, 2, ..., N) being connected to the return input of the same rank MAC cell, the first input of the rank p multiplexer being related to a coefficient $u^*_{k,i}$ different from one multiplexer to the next, the second input of the rank p multiplexer being connected to the return output from the rank p+1 MAC cell, the second input to the rank N multiplexer being connected to the return output of the diagonal cell, the first command state setting up a direct electrical connection between the first input and the output of each multiplexer.

According to a second embodiment of the invention, the return output from the rank p MAC cell (p=1, 2, ..., N) is connected to the return input of the rank p−1 MAC cell, the means of loading coefficients $u^*_{k,i}$ on the return inputs of MAC cells consist of a multiplexer controlled by a first command state, the multiplexer having a first input, a second input and an output, the output from the multiplexer being connected to the return input of the rank N MAC cell, the first multiplexer input being connected in sequence to one of the $u^*_{k,i}$ coefficients and the second multiplexer input being connected to the return output from the diagonal cell, the first command state setting up a direct electrical connection between the first multiplexer input and the multiplexer output.

According to another characteristic of the device according to the invention, MAC cells, the diagonal cell and all multiplexers controlled by a second command state form a network to calculate the estimated vector d̂ that corresponds to the vector d of data emitted by users.

The invention also relates to a method for joint detection of data transmitted by direct sequence spread spectrum (DSSS), the method comprising a Cholesky decomposition step to calculate a matrix U such that:

$$L=U^H \times U,$$

where L is an equalization matrix and U is an upper triangular matrix. The Cholesky decomposition step includes:

a step to calculate the diagonal coefficients $U_{i,i}$ of the matrix U according to the formula:

$$u_{i,i} = \sqrt{1_{i,i} - \sum_{k=1}^{i-1} |U_{k,i}|^2} \qquad (1)$$

where $l_{i,i}$ is the diagonal coefficient of row rank i of the matrix L and $u_{k,i}$ is the coefficient of the row rank k and column rank i of matrix U, and a step to calculate non-diagonal coefficients $u_{i,j}$ of the matrix in the form:

$$u_{i,j} = \frac{l_{i,j} - \sum_{k=1}^{i-1} u^*_{k,i} \cdot u_{k,j}}{u_{i,i}},$$

the step for calculating the non-diagonal coefficients including a step for loading coefficients $u^*_{k,i}$ on return inputs of MAC cells installed in series, each MAC cell comprising an accumulation input, an accumulation output, a return input, a return output and a coefficient input, the accumulation output of the rank p cell (p=1 to N) being connected to the accumulation input of the rank p+1 cell, a step for loading coefficients $u_{k,j}$ on MAC cell coefficient inputs, a step for loading coefficients $u_{i,i}$ on a division coefficient input of a diagonal cell, the diagonal cell (DIAG) comprising a subtraction coefficient input, a result output, a return input, a return output and a division coefficient input, the accumulation input of the diagonal cell being connected to the accumulation output of the rank N MAC cell, and a step for loading coefficients $l_{i,j}$ onto the return input of the diagonal cell.

According to the first embodiment of the invention, the coefficients $u^*_{k,i}$ are loaded in parallel on the return inputs of MAC cells.

According to the second embodiment of the invention, the $u^*_{k,i}$ coefficients are loaded in sequence on MAC cell return inputs, starting from the rank N MAC cell.

According to another characteristic of the invention, the method comprises a step to calculate the estimated vector $\hat{d}$ corresponding to the data vector d of emitted by users. The calculation step for the estimated vector $\hat{d}$ includes:

a first step to solve the triangular linear system by the recurrence $$y_i = \frac{1}{U_{ii}^H}\left(z_i - \sum_{k=1}^{i-1} U_{ik}^H y_k\right)$$

to solve the equation $z=U^H.y$, where $y=U.\hat{d}$, and a second step to solve the triangular linear system by the recurrence $$\hat{d}_i = \frac{1}{u_{i,i}}\left(y_i - \sum_{k=i+1}^{N} u_{ik}\hat{d}_k\right)$$

to solve the equation $y=U.\hat{d}$.

Advantageously, the joint detection method according to the invention uses Cholesky decomposition operations and operations to solve a triangular system using the same circuits, thus reducing the physical complexity of the device.

Control means are used to control sequential loading of the different circuits (MAC cells, diagonal cell, multiplexers) by appropriate coefficients.

In the above equations, the $u_{ii}$, $u_{ij}$, a, $a_d$, b, accu coefficients are usually complex numbers. However, note that the invention also relates to the case in which these coefficients are real numbers.

Furthermore, note that the matrix U is a band matrix. Therefore, the coefficients $u_{i,i}$ and $u_{i,j}$ mentioned above are only calculated for coefficients $u_{k,i}$ and $u_{k,j}$ that are not zero. In the rest of the description, the coefficients $u_{k,i}$ and $u_{k,j}$ that are not zero will preferably be denoted $u_{kp,i}$ and $u_{kp,j}$ where p=1, 2, ..., N.

BRIEF DESCRIPTION OF THE FIGURES

Other characteristics and advantages of the invention will become clear after reading a preferred embodiment with reference to the attached figures among which

The same references denote the same elements in all the figures.

DETAILED DESCRIPTION OF EMBODIMENTS OF THE INVENTION

Figure 1A:
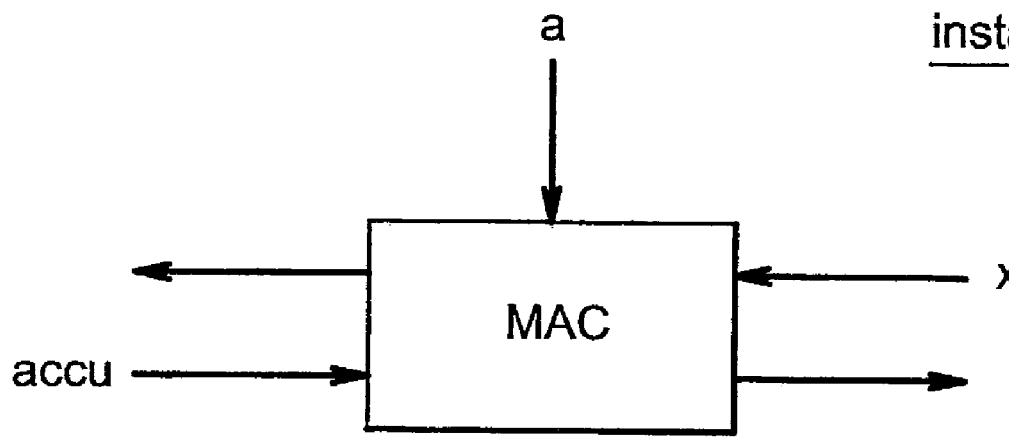
FIGS. 1A and 1B represent a first type of cell used in the detection device according to the invention.
Figure 1B:
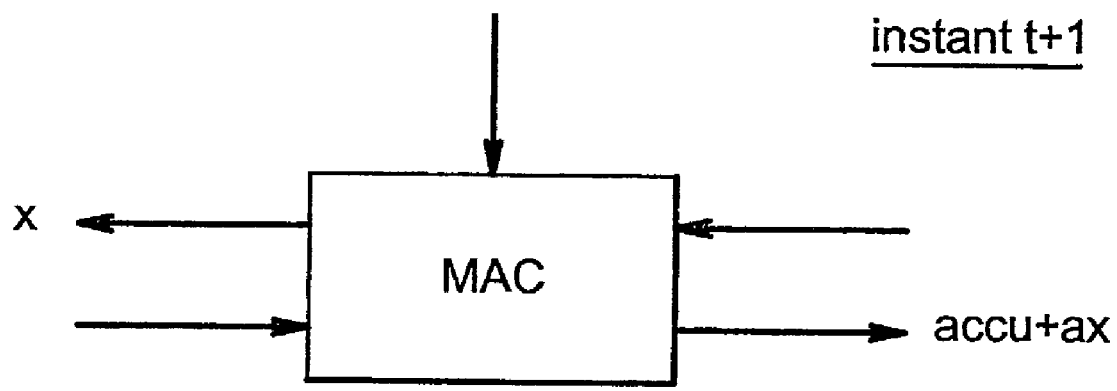

FIGS. 1A and 1B show a first type of cell used in the detection device according to the invention.

This first type of cell, called a MAC ("Multiplication ACcumulation") cell is provided with three inputs and two outputs. FIGS. 1A and 1B show input and output signals respectively for a MAC cell at times t and t+1. If the accu, x and a magnitudes are applied to the three inputs respectively at time t (see FIG. 1A), then at time t+1 the two outputs will produce the magnitudes x and accu+ax (see FIG. 1B). For reasons of convenience, the inputs/outputs of a MAC cell will be referred to as follows in the remainder of this description:

the input to which the magnitude accu is applied at time t will be called the MAC cell accumulation input, the input to which the magnitude a is applied at time t will be called the MAC cell coefficient loading input, the input to which the magnitude x is applied at time t will be called the MAC cell return input, the output at which the magnitude accu+ax is produced will be called the MAC cell accumulation output, the output at which the magnitude x is produced at time t+1 will be called the MAC cell return output.

Figure 2:
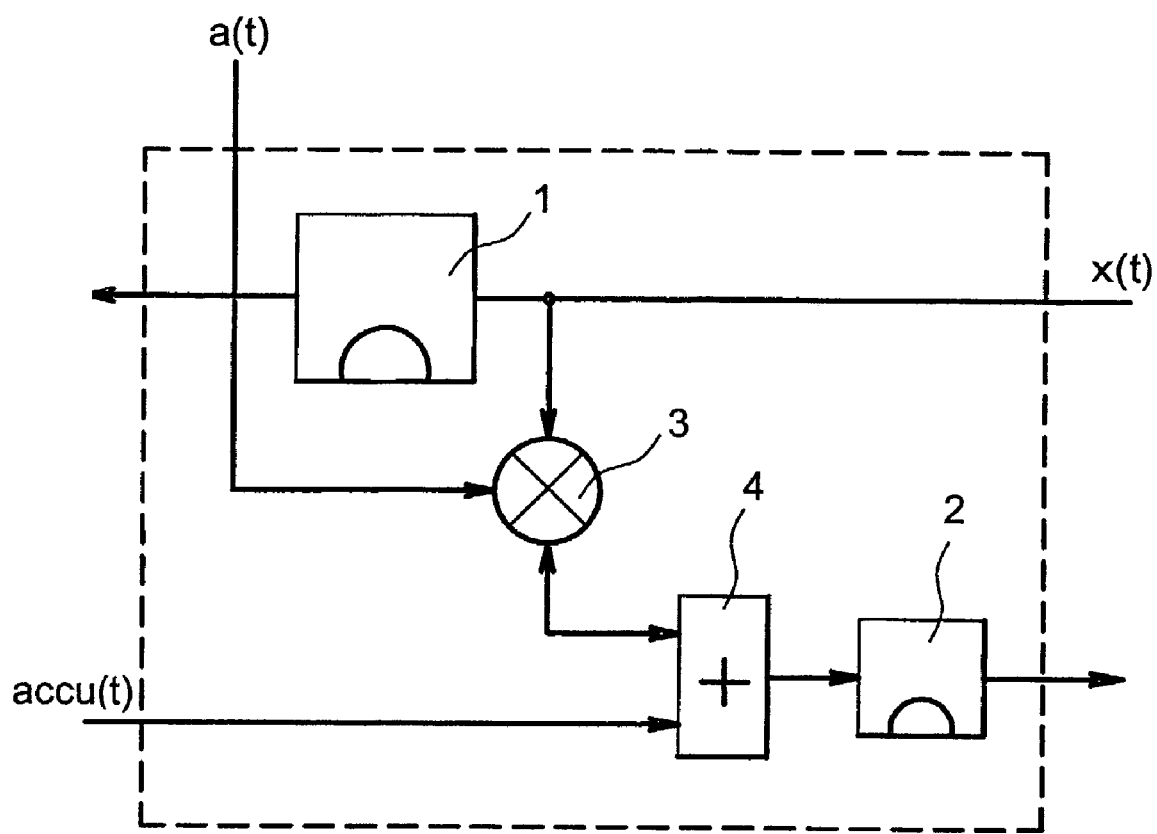
FIG. 2 illustrates an example embodiment of the first type of cell represented in FIGS. 1A and 1B, FIGS. 3A and 3B represent a second type of cell used in the detection device according to the invention.

FIG. 2 shows an example of a MAC cell used in the detection device according to the invention.

The cell comprises two delay operators 1, 2, a multiplier 3 and an adder 4. At time t, a coefficient a is applied on the coefficient loading input, data x(t) is input into the delay operator 1 and an accu(t) data is input into the adder 4. The multiplier 3 multiplies the coefficient a and the data x(t). The adder 4 adds the data accu(t) and the data ax(t) output by the multiplier 3. The data accu(t)+ax(t) that is input into the delay operator 2 at time t is output at time t+1 and the data x(t) that is input into the delay operator 1 at time t is output at time t+1.

Figure 3A:
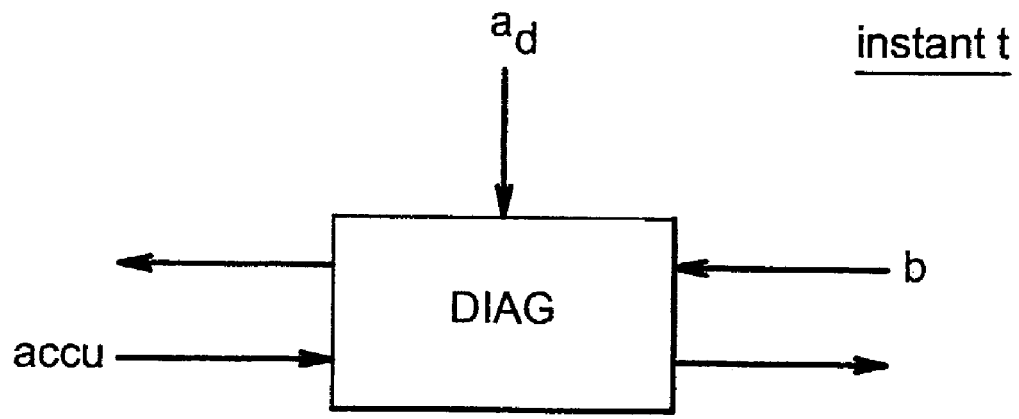
Figure 3B:
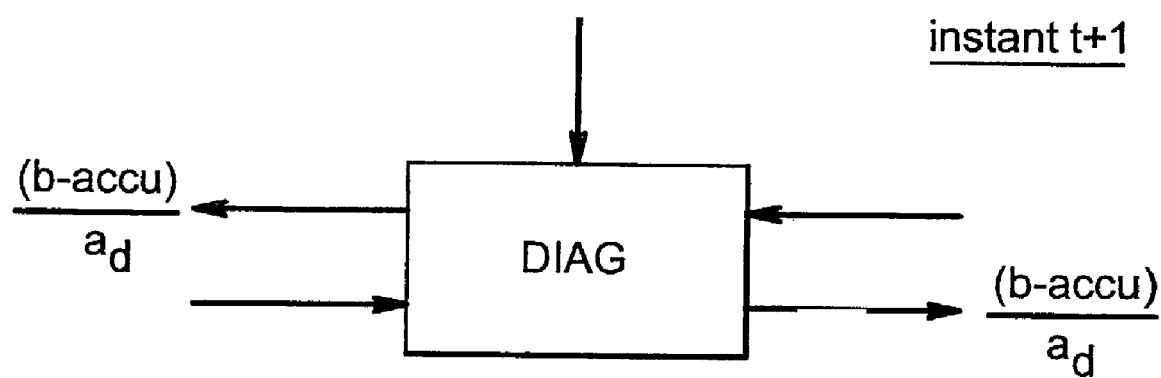

FIGS. 3A and 3B show a second type of cell used in the detection device according to the invention;

This second type of cell called a diagonal cell is also provided with three inputs and two outputs. FIGS. 3A and 3B show the input signals and output signals respectively of a diagonal cell at times t and t+1. If the accu, b and $a_d$ magnitudes are applied to the three inputs respectively at time t (see FIG. 3A), then the two outputs will output the magnitude (b-accu)/$a_d$ at time t+1 (see FIG. 3B). For reasons of convenience, the inputs/outputs of a diagonal cell will be referred to as follows in the rest of this description:

the input to which the magnitude accu is applied at time t will be called the MAC cell accumulation input, the input to which the magnitude a is applied at time t will be called the MAC cell coefficient loading input, the input to which the magnitude x is applied at time t will be called the MAC cell return input, one of the outputs at which the magnitude (b-accu)/$a_d$ is produced at time t+1 will be referred to as the diagonal cell result output and the other output will be called the diagonal cell return output, which depends on the direction of movement of the data, as will be described later.

Figure 4:
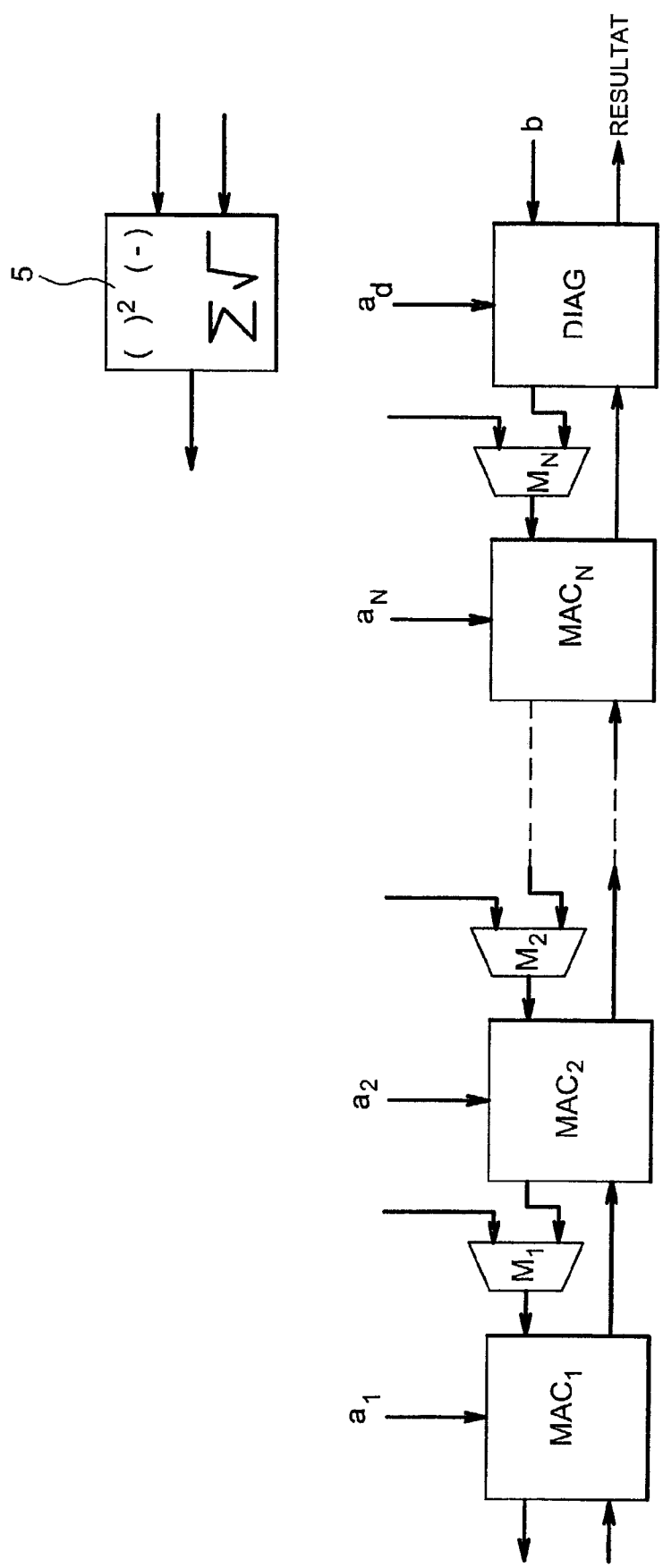
FIG. 4 represents a first embodiment of the detection device according to the invention.

FIG. 4 shows a first embodiment of the detection device according to the invention.

The detection device according to the first embodiment of the invention comprises a circuit 5 for use of equation (1), a set of N cells MAC, $MAC_1$, $MAC_2$, ... $MAC_N$, a diagonal cell DIAG and a set of N multiplexers $M_1$, $M_2$, ..., $M_N$. For the purposes of calculating equation (1), the circuit 5 includes for example a squaring operator, an adder, a subtractor and a square root calculation operator.

The accumulation input of the rank p MAC cell (p=1, 2, ..., N) is connected to the accumulation output from the rank p−1 MAC cell and the accumulation output from the rank N MAC cell is connected to the accumulation input of the diagonal cell. The return inputs and outputs of the MAC cells are connected through multiplexers. Each multiplexer has two inputs and one output. The return input of the Rank p MAC cell (p=1, 2, ..., N−1) is then connected to the rank p multiplexer output for which one of the two inputs is connected to the return output from the rank p+1 MAC cell. The return input of the rank N MAC cell is connected to the output from the rank N multiplexer for which one of the two inputs is connected to the return output from the diagonal cell.

Figure 5:
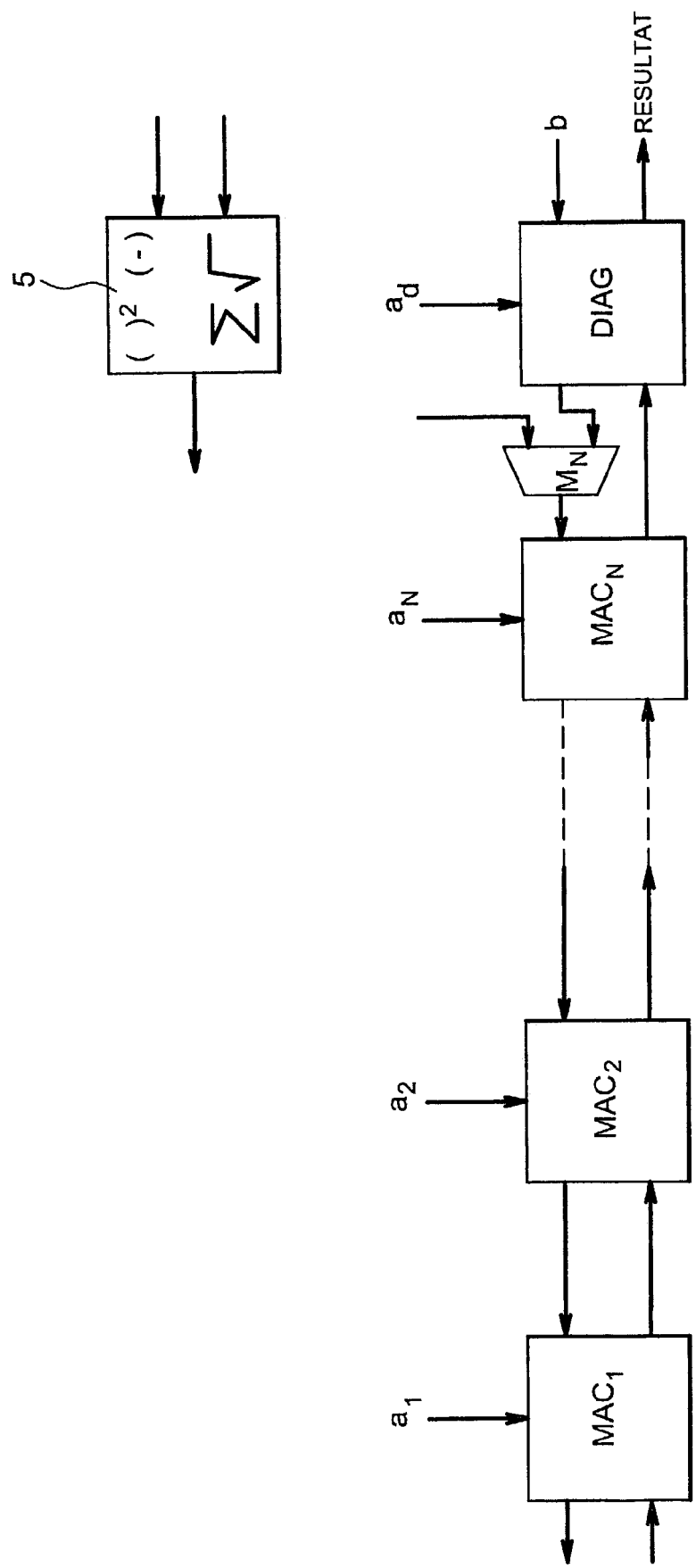
FIG. 5 represents a second embodiment of the detection device according to the invention.

FIG. 5 shows a second embodiment of the detection device according to the invention.

The detection device according to the second embodiment of the invention comprises a circuit 5 for use of equation (1), a set of N cells MAC, $MAC_1$, $MAC_2$, ... $MAC_N$, a diagonal cell DIAG and a multiplexer $M_N$, each with two inputs and one output.

The MAC cell accumulation inputs/outputs are connected to each other as shown in FIG. 4. The return output from the rank p MAC cell (p=1, 2, ..., N) in this case is connected to the return input of the rank p−1 MAC cell. The output of the multiplexer $M_N$ is connected to the return input of the rank N MAC cell and a first input connected to the return output from the diagonal cell.

As mentioned above, the Cholesky decomposition consists of calculating the coefficients of $u_{i,j}$ of a matrix U such that:

$L = U^H \times U$

The matrix U is an upper triangular matrix. The diagonal coefficient of row i is written:

$$u_{i,i} = \sqrt{l_{i,i} - \sum_{k=1}^{i-1} |u_{k,i}|^2} \quad (1)$$

and the non diagonal coefficients of row i are written:

$$u_{i,j} = \frac{l_{i,j} - \sum_{k=1}^{i-1} u_{k,i}^* \cdot u_{k,j}}{u_{i,i}} \quad (2)$$

According to the invention, the coefficients of the matrix U are calculated row by row, from the first row to the last row, the diagonal coefficient of a row being calculated before the non-diagonal coefficients of the row. As a non-limitative example, for a 3×3 matrix U, the coefficients can be calculated as follows in sequence:

$u_{11}$, then $u_{12}$, then $u_{13}$ for the first row, then $u_{22}$, then $u_{23}$ for the second row, then $u_{33}$ for the third row.

The diagonal coefficients $u_{i,i}$ are calculated using the circuit 5 that uses equation (1).

The principle used to calculate non-diagonal coefficients $u_{i,j}$ of the U matrix will now be described with reference to FIGS. 6 and 7.

During the calculation of the diagonal element $u_{i,j}$, the coefficients $u^*_{k,i}$ will be applied to the return inputs of the MAC cells. The return stream is fixed during the calculation of all coefficients $u_{i,j}$ in the same row since these values $u^*_{k,i}$ are necessary for the calculation of all these coefficients.

There are two possible embodiments for loading the coefficients $u^*_{k,i}$.

Figure 6:
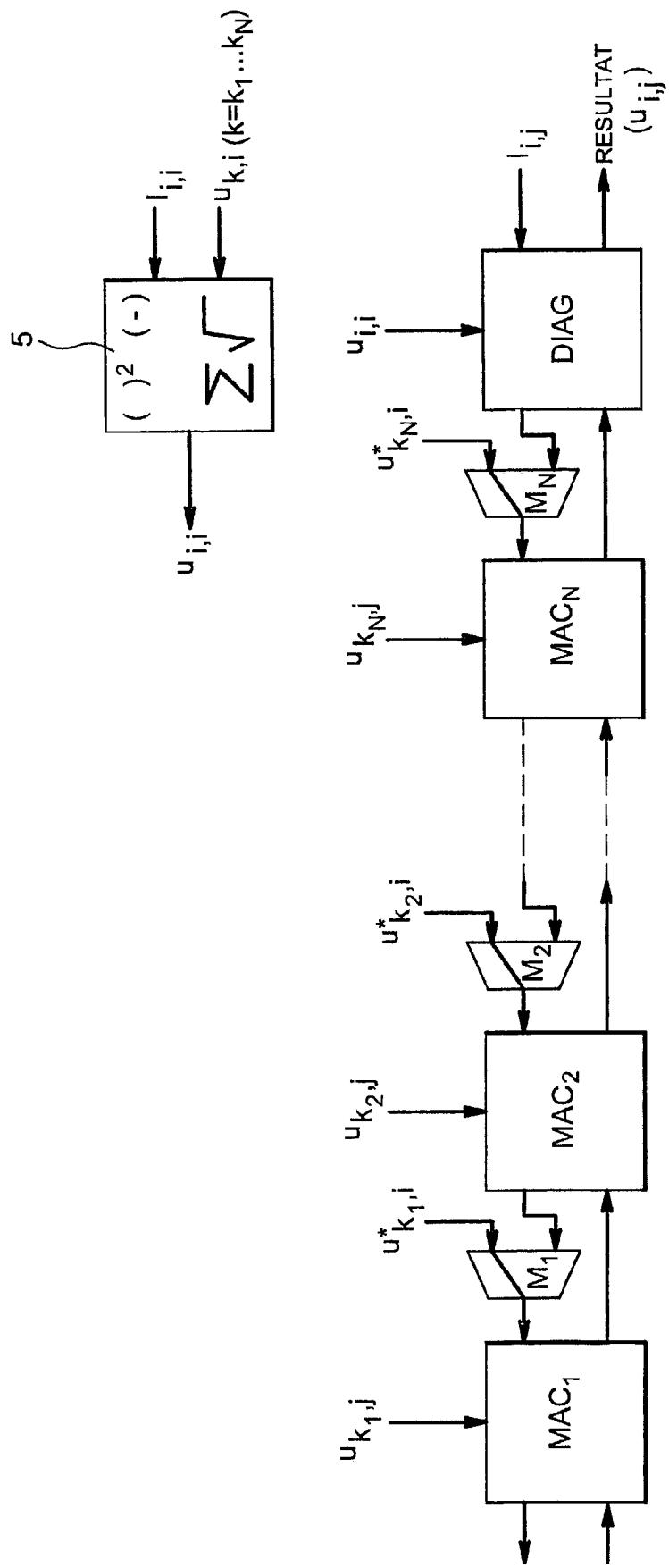
FIG. 6 represents implementation of the Cholesky decomposition step using a detection device according to the first embodiment of the invention.

FIG. 6 represents a first method of loading the coefficients $u^*_{k,i}$. The first method of loading the coefficients $u^*_{k,i}$ is the loading mode associated with the first embodiment of the device according to the invention.

Multiplexers controlled by a first command state enable parallel loading of $u^*_{k,i}$ values on the return inputs of MAC cells during the calculation of non-diagonal coefficients of the matrix U.

Figure 7:
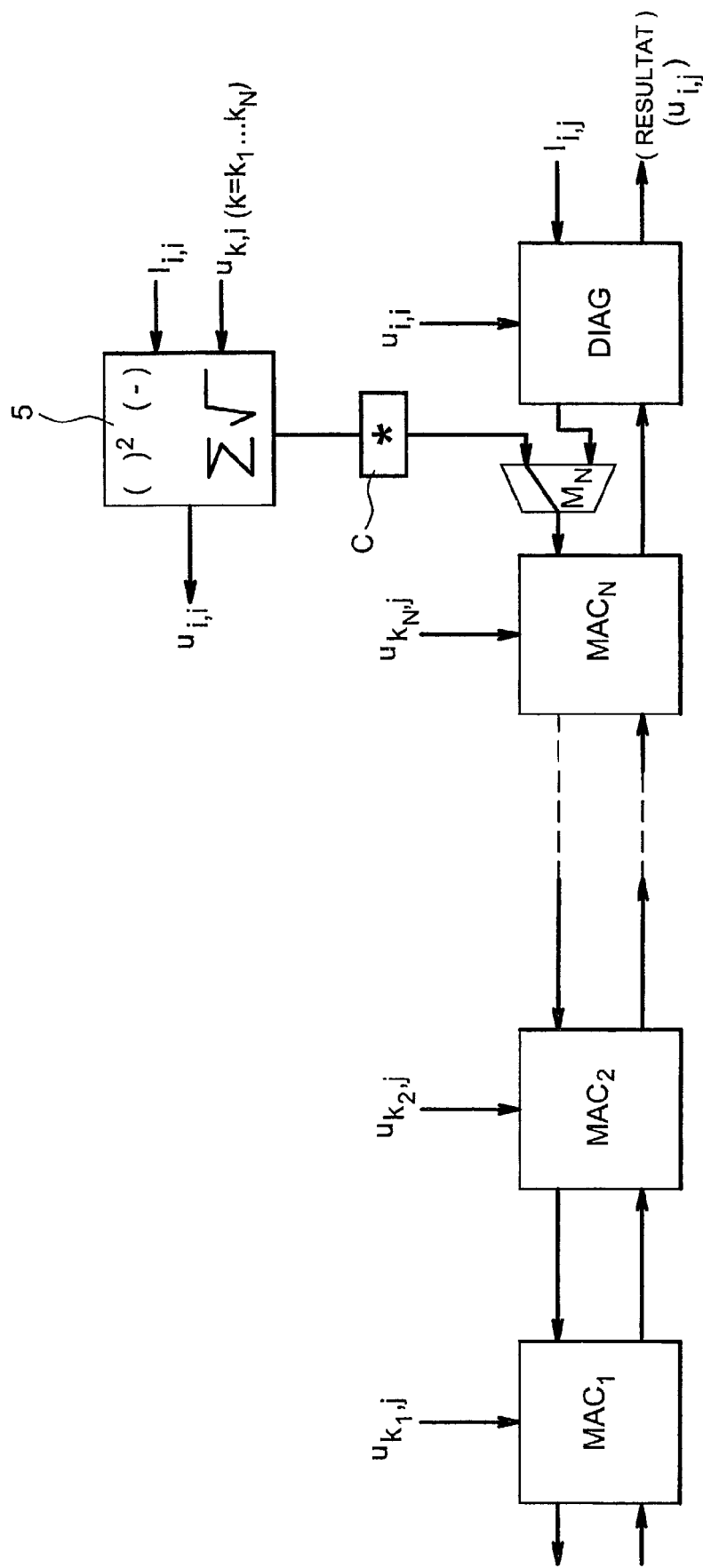
FIG. 7 represents implementation of the Cholesky decomposition step using a detection device according to the second embodiment of the invention.

FIG. 7 shows a second method of loading the coefficients $u^*_{k,i}$. The second method of loading the coefficients $u^*_{k,i}$ is associated with the second embodiment of the device according to the invention.

According to the second loading method, the $u^*_{k,i}$ values are loaded one after the other. The multiplexer $M_N$ controlled by a first command state is a means of applying $u^*_{k,i}$ values on the return input of the rank N MAC cell.

According to this second loading method, the circuit 5 for calculating the diagonal elements may be connected to the multiplexer $M_N$ as shown in FIG. 7. The coefficient $u_{k,i}$ that is applied to an input of circuit 5 is then also applied as an input to a conjugation operator C that outputs the coefficient $u^*_{k,i}$ that is applied to the input of multiplexer $M_N$. The quantity $$\sum_{k=1}^{i-1} |u_{k,i}|^2$$

is then calculated while loading the return stream registers. Once this loading has been terminated, the stream is fixed to calculate non-diagonal elements.

More generally, the order in which the coefficients $u^*_{k,i}$ are applied to the different return inputs of the MAC cells is not really important. The products $u^*_{k,i} u_{k,j}$ may be calculated in any order before being summated. The only condition that has to be satisfied for loading the coefficients $u^*_{ki}$ on the return inputs of the MAC cells is that the same index i is kept until the quantity $$u_{i,j} = \frac{l_{i,j} - \sum_{k=1}^{i-1} u^*_{k,i} \cdot u_{k,j}}{u_{i,i}}$$

has been calculated.

One necessary condition for the calculation of the coefficient $u_{i,j}$ is to apply all coefficients $u_{k,j}$, where j can be all possible values, to the coefficient input of the MAC cell to which the coefficient $u^*_{ki}$ is applied on its return input.

The calculated diagonal and non-diagonal coefficients of the matrix U will be stored as they are determined. This is why the joint detection device according to the invention is provided with storage circuits (not shown in the figures).

Figure 8:
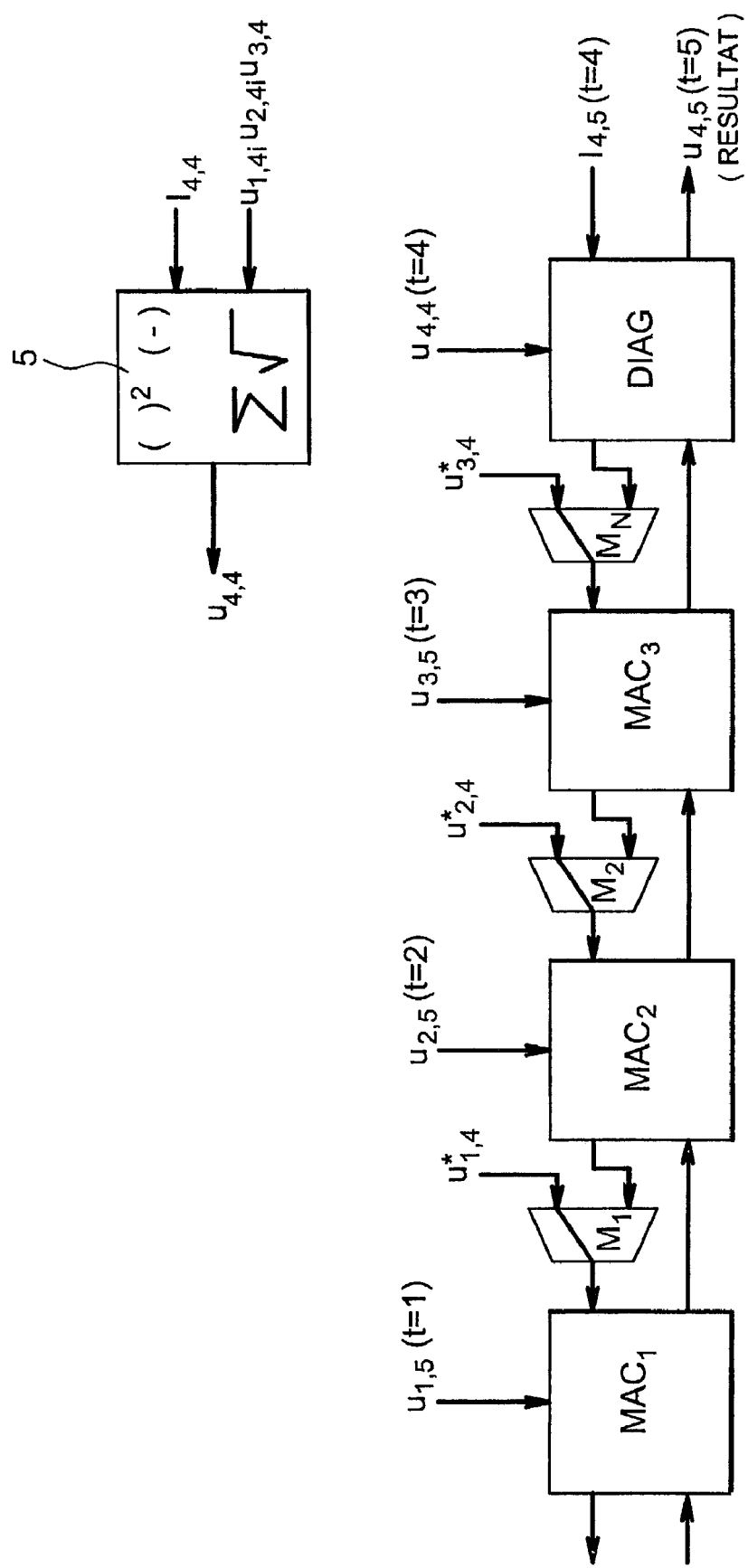
FIG. 8 represents an example implementation of the Cholesky decomposition step using a detection device according to the first embodiment of the invention.

One non-limitative example calculation of the coefficient $u_{i,j}$ of the matrix U with a size more than 4 will now be given with the description for FIG. 8.

This example corresponds to an embodiment of the invention according to the coefficient loading mode shown in FIG. 6. The coefficient $u_{45}$ is calculated in the example described.

The detection device comprises three MAC cells (MAC, ($MAC_1$, $MAC_2$, $MAC_3$) and a diagonal cell (DIAG). It is assumed that the coefficients $u^*_{14}$, $u^*_{24}$, $u^*_{34}$ are applied to the corresponding return inputs of the $MAC_1$, $MAC_2$, $MAC_3$ cells.

At time t=1, the coefficient $u_{15}$ is applied to the coefficient input of the $MAC_1$ cell. The accumulation output of this cell will then change to $u^*_{14}u_{15}$ at time t=2.

At time t=2, the coefficient $u_{25}$ is applied to the coefficient input of cell $MAC_2$. The accumulation output of this cell will then change to $u^*_{24}.u_{25}$+accu where accu is the value applied to the accumulation input of cell $MAC_2$ which is equal to $u^*_{14}u_{15}$. The accumulation output of the $MAC_2$ cell is therefore equal to $u^*_{14}u_{15}+u^*_{24}u_{25}$.

At time t=3, $u_{35}$ is applied to the coefficient input of cell $MAC_3$. The accumulation output of $MAC_3$ then changes to the value $p_1=u^*_{34}.u_{35}+u^*_{24}u_{25}+u^*_{14}.u_{15}$. Therefore the diagonal cell will have the value $p_1$ set on its accumulation input. By applying $u_{44}$ and $l_{45}$ respectively onto the accumulation input and the return input of the diagonal cell, the result output from the diagonal cell changes to $$u_{45} = \frac{l_{45} - p_1}{u_{44}},$$

which is the value that is to be calculated.

The accumulation of the terms of $p_1$ moves towards the right of the figure (the direction of the accumulated data). The MAC cells remaining on the left are then no longer used. It is then advantageously possible to reassign these cells to the calculation of the product terms to be used by other elements in the next current row.

As a non-limitative example, the following table describes how the coefficients $u_{k,j}$ are assigned to MAC cells to calculate the $u_{45}$, $u_{46}$, $u_{47}$ values in the previous example.

TABLE

| TIME | MAC1 a | MAC2 a | MAC3 a | DIAG a | DIAG b | Res |
|---|---|---|---|---|---|---|
| t = 1 | $u_{15}$ | | | | | |
| t = 2 | $u_{16}$ | $u_{25}$ | | | | |
| t = 3 | $u_{17}$ | $u_{26}$ | $u_{35}$ | | | |
| t = 4 | | $u_{27}$ | $u_{36}$ | $u_{44}$ | $l_{45}$ | |
| t = 5 | | | $u_{37}$ | $u_{44}$ | $l_{46}$ | $u_{45}$ |
| t = 6 | | | | $u_{44}$ | $l_{47}$ | $u_{46}$ |
| t = 7 | | | | | | $u_{47}$ |

Once the matrix U has been determined, the method according to the invention comprises the following steps in sequence:

a first step to solve the triangular linear system by the recurrence:

$$y_i = \frac{1}{u_{ii}^H}\left(z_i - \sum_{k=1}^{i-1} u_{ik}^H y_k\right)$$

to solve the equation $z=U^H.y$, where $y=U.\hat{d}$, and a second step to solve the triangular linear system by the recurrence:

$$\hat{d}_i = \frac{1}{u_{i,i}}\left(y_i - \sum_{k=i+1}^{N} u_{ik}\hat{d}_k\right)$$

to solve the equation $y=u.\hat{d}$.

For the first and second steps in solving the triangular linear system mentioned above, the multiplexers are set such that the return output from the rank p MAC cell (p=1, 2, ..., N) are directly connected to the return input of the rank p−1 MAC cell, the return output from the diagonal cell being directly connected to the return input of the rank N MAC cell.

The diagonal cell and the MAC cells then form a network like that described, for example, in the document entitled "Introduction to VLSI systems" (Kung, H. T. and Leiserson, C. E., chapter Systolic arrays for VLSI (chap. 8.3), Addison-Wesley, 1980).

In a manner known in itself, this type of network can be used to solve an equation of the type Ax=b where A is a known triangular matrix, b is a known vector and x is an unknown vector to be determined.

Each component of the solution vector x is calculation according to the following recurrence:

$$\begin{cases} x^{(0)} = 0 \\ \vdots \\ x_i^{(k)} = x_i^{(k-1)} + a_{i,k} \cdot x_k \text{ for } 0 < k < i \\ \vdots \\ x_i = (b_i - x_i^{(i-1)})/a_{i,i} \end{cases} \quad (6)$$

where $x_i^{(k)}$ represents the $k^{th}$ step in the calculation of element $x_i$.

When an element $x_i^{(k)}$ initialized to 0 circulates in the network, it accumulates the products calculated in each MAC cell. The final value is calculated in the diagonal cell. It is then reinjected into the network to circulate unchanged in the reverse direction in the network, thus enabling the following elements $x_j^{(k)}$ (j>i) to accumulate the products $a_{j,i}x_i$. Several elements $x_i^{(k)}$ are thus calculated in parallel as in a pipeline.

The MAC cell inputs and outputs between which elements $x_j^{(k)}$ calculated by successive accumulations circulate, are the accumulation input and accumulation output respectively of MAC cells. Similarly, the MAC cell input and output between which elements $x_j^{(k)}$ reinjected from the diagonal cell circulate, are the return input and return output of MAC cells respectively, and the inputs of MAC cells and of the diagonal cell on which the coefficients $a_{i,k}$ are applied are the coefficient loading inputs.

The coefficients of matrix A are loaded into the network diagonal by diagonal. Consequently, if A is a band matrix with width Lg, the number of MAC cells in the network may be reduced to Lg−1. Thus, the size of the network is not related to the band width of matrix A, rather than the size of the system.

Figure 9:
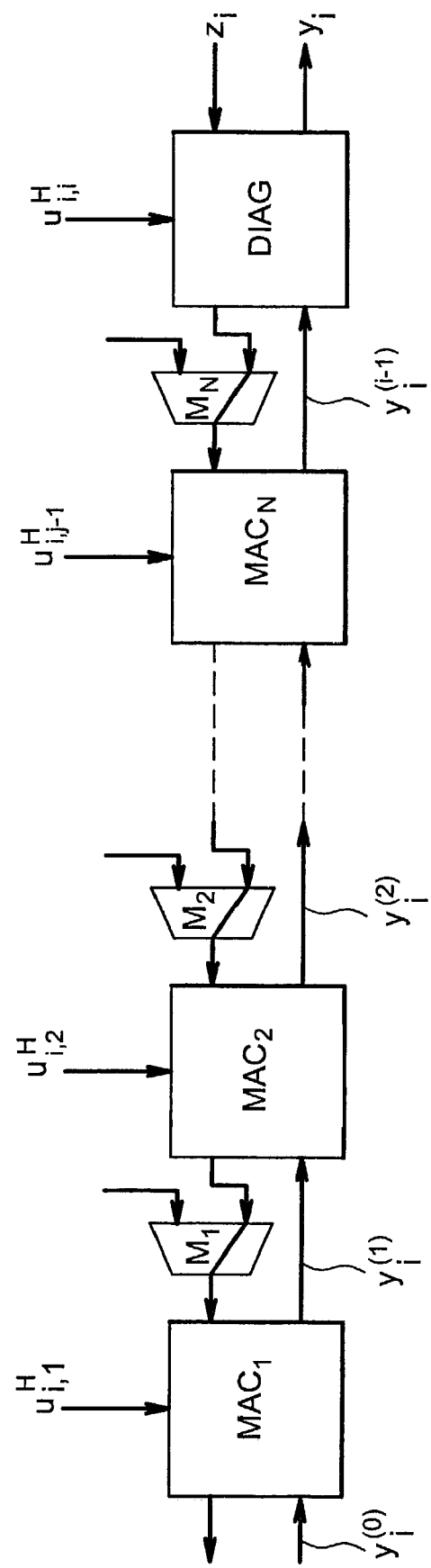
FIG. 9 represents the implementation of a first step in the solution of a triangular system using a detection device according to the first embodiment of the invention.
Figure 10:
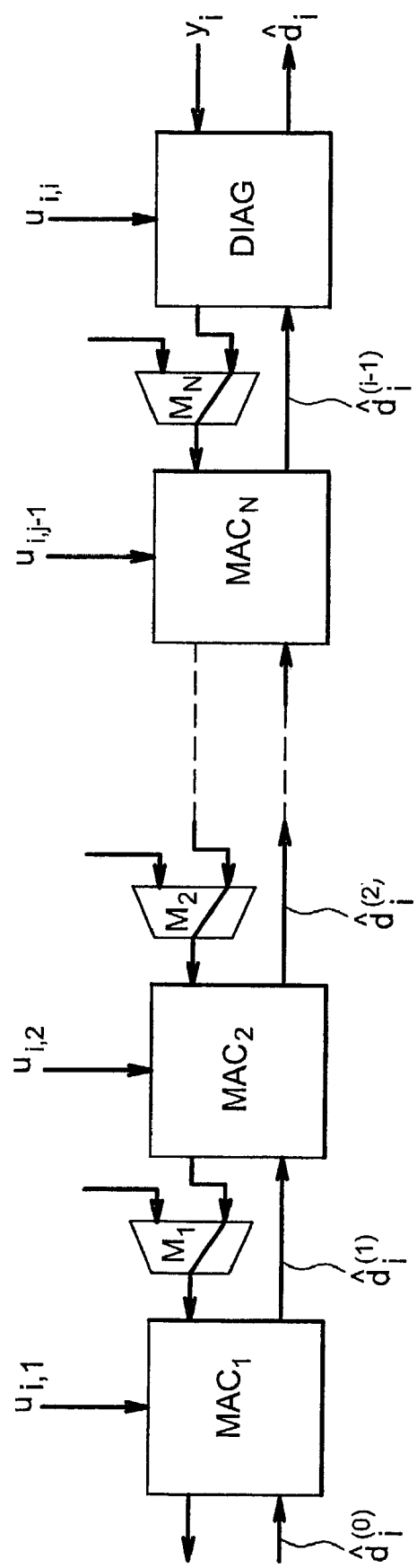
FIG. 10 represents the implementation of a second step in the solution of a triangular system following the first step in the solution of a triangular system using a detection device according to the first embodiment of the invention.

FIG. 9 represents the calculation of the coefficients $y_i$ of the matrix y, and FIG. 10 represents the calculation of the coefficients $\hat{d}_i$ of the estimated vector $\hat{d}$, using the device according to the first embodiment of the invention.

For the first step in solving the triangular linear system, the coefficients of the transposed matrix of the conjugated matrix of U are applied to the coefficient inputs of the MAC cells and of the diagonal cell (see FIG. 9). For the second step in solving the triangular linear system, the coefficients of the matrix U are applied to the coefficient inputs of the MAC cells and the diagonal cell (see FIG. 10).

FIGS. 9 and 10 relate to a detection device according to the first embodiment of the invention. Although not shown in the figures, it is clear that the invention also relates to the calculation of the matrix y and the calculation of the vector $\hat{d}$ using a detection device according to the second embodiment of the invention.

In order to apply the invention to mobile phones, the method according to the invention may for example be capable of processing data transmitted in the FDD (Frequency Division Duplex) and TDD (Time Division Duplex) communication modes. Data may advantageously be processed in real time.

The invention claimed is:

1. An apparatus for calculating coefficients of a Cholesky decomposition of a matrix, the apparatus comprising:
    a multiplicity, N, of multiplication accumulation (MAC) cells to be connected together in series, wherein each MAC cell includes an accumulation input, an accumulation output, a return input, a return output, and a coefficient input, wherein the accumulation output of a previous ($p^{th}$) MAC cell is to be connected to the accumulation input of a next ($(p+1)^{st}$) MAC cell (p=1, . . ., N−1); and
    a diagonal cell to be connected to the multiplicity of MAC cells, wherein the diagonal cell includes an accumulation input, a result output, a return input, a return output, and a coefficient input, wherein the accumulation input of the diagonal cell is to be connected to the accumulation output of the $N^{th}$ MAC cell,
    wherein coefficients of the Cholesky decomposition are to be coupled to return and coefficient inputs of at least one of said MAC cells and to the coefficient input of the diagonal cell.

2. The apparatus according to claim 1, wherein said diagonal cell is to receive a coefficient of the matrix at its return input.

3. The apparatus according to claim 1, further comprising:
    at least one multiplexer coupled to at least one return input of at least one of said MAC cells, wherein at least one coefficient of the Cholesky decomposition is to be fed to an input of said at least one multiplexer.

4. The apparatus according to claim 1, further comprising:
    a circuit to perform at least one operation selected from the group consisting of squaring, adding, subtracting, and taking a square root,
    wherein an output of the circuit is to be coupled to provide at least one coefficient of the Cholesky decomposition to at least one input of a MAC cell or a diagonal cell.

5. The apparatus according to claim 1, wherein at least one said MAC cell comprises:
    an adder;
    a multiplier; and
    at least two delay elements,
    wherein an output of said multiplier is to be coupled to an input of said adder;
    wherein said coefficient input and said return input are to be coupled to inputs of said multiplier;
    wherein said accumulation input is to be coupled to an input of said adder; and
    wherein said at least two delay elements are coupled to provide said return output and said accumulation output.

6. The apparatus according to claim 5, wherein at least one delay element has an input coupled to said return input.

7. The apparatus according to claim 5, wherein at least one delay element has an input coupled to an output of said adder.

8. The apparatus according to claim 1, wherein said diagonal element is to provide at said return output and said result output a signal equal to a difference between said return input and said accumulation input, divided by said coefficient input.

9. A system for jointly receiving multiple communication signals, the system comprising:
    means for receiving said communication signals; and
    a circuit coupled to said means for receiving and to jointly estimate data carried on said communication signals, the circuit comprising:
    a multiplicity, N, of multiplication accumulation (MAC) cells to be connected together in series, wherein each MAC cell includes an accumulation input, an accumulation output, a return input, a return output, and a coefficient input, wherein the accumulation output of a previous ($p^{th}$) MAC cell is to be connected to the accumulation input of a next ($(p+1)^{st}$) MAC cell (p=1, . . ., N−1); and
    a diagonal cell to be connected to the multiplicity of MAC cells, wherein the diagonal cell includes an accumulation input, a result output, a return input, a return output, and a coefficient input, wherein the accumulation input of the diagonal cell is to be connected to the accumulation output of the $N^{th}$ MAC cell,
    wherein coefficients of a Cholesky decomposition of a matrix to be used to jointly estimate said data are to be coupled to return and coefficient inputs of at least one of said MAC cells and to the coefficient input of the diagonal cell.

10. The system according to claim 9, wherein said matrix is an equalization matrix corresponding to a joint communication channel from which the multiple communication signals are to be received.

11. The system according to claim 10, wherein said joint communication channel is a code-division multiple-access (CDMA) channel in which each of the multiple communication signals is spread using a different spreading code.

12. An apparatus for calculating coefficients of a Cholesky decomposition of a matrix, the apparatus comprising:
- a number, N, of first modules to be connected together in series, each of said first modules configured to perform multiplication and accumulation operations; and
- a second module to be connected to the first modules, with an accumulation output of the Nth first module to be connected as an input to the second module,
- wherein the second module is structurally different from the first modules,
- wherein coefficients of the Cholesky decomposition are to be coupled to at least one input of at least one first module and to an input of the second module,
- wherein said second module is to provide, as an output, a coefficient of the Cholesky decomposition.

13. The apparatus according to claim 12, wherein said second module is to receive a coefficient of the matrix at a further input.

14. The apparatus according to claim 12, further comprising:
- at least one multiplexer coupled to at least one input of at least one of said first modules, wherein at least one coefficient of the Cholesky decomposition is to be fed to an input of said at least one multiplexer.

15. The apparatus according to claim 12, further comprising:
- a circuit to perform at least one operation selected from the group consisting of squaring, adding, subtracting, and taking a square root,
- wherein an output of the circuit is to be coupled to provide at least one coefficient of the Cholesky decomposition to at least one input of a first module or a second module.

16. The apparatus according to claim 12, wherein at least one said first module comprises:
- an adder;
- a multiplier; and
- at least two delay elements,
- wherein an output of said multiplier is to be coupled to an input of said adder;
- wherein two inputs to said first module are to be coupled to inputs of said multiplier;
- wherein another input to said first module is to be coupled to an input of said adder; and
- wherein said at least two delay elements are coupled to provide outputs of said first module.

17. The apparatus according to claim 12, wherein said second module is to provide at at least one output of the second module a signal equal to a difference between two inputs to the second module, divided by a coefficient provided at an input to the second module.

18. A system for jointly receiving multiple communication signals, the system comprising:
- means for receiving said communication signals; and
- a circuit coupled to said means for receiving and to jointly estimate data carried on said communication signals, the circuit comprising:
  - a number, N, of first modules to be connected together in series, each of said first modules configured to perform multiplication and accumulation operations; and
  - a second module to be connected to the first modules, with an accumulation output of the Nth first module to be connected as an input to the second module, wherein the second module is structurally different from said first modules,
  - wherein coefficients of a Cholesky decomposition of a matrix are to be coupled to at least one input of at least one first module and to an input of the second module, and
  - wherein said second module is to provide, as an output, a coefficient of the Cholesky decomposition.

19. The system according to claim 18, wherein said matrix is an equalization matrix corresponding to a joint communication channel from which the multiple communication signals are to be received.

20. The system according to claim 19, wherein said joint communication channel is a code-division multiple-access (CDMA) channel in which each of the multiple communication signals is spread using a different spreading code.

* * * * *